US010910709B1

United States Patent
Hill et al.

(10) Patent No.: US 10,910,709 B1
(45) Date of Patent: Feb. 2, 2021

(54) CONTROL ARCHITECTURE FOR ELECTRONICALLY SCANNED ARRAY

(71) Applicant: Rockwell Collins, Inc., Cedar Rapids, IA (US)

(72) Inventors: Adrian A. Hill, Vinton, IA (US); Thomas B. Campbell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 385 days.

(21) Appl. No.: 15/876,995

(22) Filed: Jan. 22, 2018

(51) Int. Cl.
*H01Q 3/26* (2006.01)
*H01Q 21/00* (2006.01)
*H01Q 3/38* (2006.01)
*H01Q 21/06* (2006.01)

(52) U.S. Cl.
CPC .............. *H01Q 3/26* (2013.01); *H01Q 3/385* (2013.01); *H01Q 21/0006* (2013.01); *H01Q 21/06* (2013.01)

(58) Field of Classification Search
CPC ........ H01Q 3/2605; H01Q 21/24; H01Q 3/34; H01Q 21/06; H01Q 3/40; H01Q 3/385
See application file for complete search history.

(56) References Cited

U.S. PATENT DOCUMENTS

| | | | | |
|---|---|---|---|---|
| 6,097,335 A * | 8/2000 | Cassen | ..................... | G01S 7/032 342/175 |
| 7,580,674 B2 * | 8/2009 | Gorsuch | .............. | H01Q 1/2258 455/25 |
| 8,207,752 B2 * | 6/2012 | Raj | ...................... | H03K 19/177 326/10 |
| 8,665,845 B2 * | 3/2014 | O'Keeffe | ............... | H01Q 1/246 370/328 |
| 9,478,858 B1 | 10/2016 | West et al. | | |
| 9,761,937 B2 * | 9/2017 | Runyon | ................... | H01Q 3/26 |
| 2005/0001784 A1 * | 1/2005 | Oliver | ...................... | H01Q 3/26 343/895 |
| 2019/0089070 A1 * | 3/2019 | Zihir | ...................... | H01Q 21/22 |

OTHER PUBLICATIONS

Valdes-Garcia. "Phased Array Innovations for 5G mmWave Beamforming." IBM Research, Toronto 5G Summit. Nov. 2015. pp. 1-59. (Year: 2015).*

* cited by examiner

*Primary Examiner* — Gregory C. Issing
(74) *Attorney, Agent, or Firm* — Suiter Swantz PC llo (57) ABSTRACT

Systems and methods relate to an electronically scanned antenna array. A beamforming circuit includes a first input, a first output, a second input, a second output and an antenna interface. The antenna interface is coupled to the electronically scanned antenna array. A first control circuit is coupled to the first input and the first output and is configured to provide first beamforming data to the beamforming circuit via the first input. A second control circuit is coupled to the second input and the second output and is configured to provide second beamforming data to the beam forming circuit via the second input.

19 Claims, 5 Drawing Sheets

CONTROL ARCHITECTURE FOR ELECTRONICALLY SCANNED ARRAY

BACKGROUND

Embodiments of inventive concepts disclosed herein relate generally to a control circuit for electronically scanned arrays (ESA) and a method of controlling an ESA. An ESA is an antenna that can be electronically steered to point in different directions.

Modern sensing and communication systems may utilize an ESA to provide a variety of functions, such as communication, radar, and sensing functions. For example, a wide band ESA can be used in electronic intelligence (ELINT) sensors, high data rate communication systems, and radar systems to perform functions including but not limited to, sensing, intelligence-gathering (e.g., signals intelligence, or SIGINT), direction finding (DF), electronic countermeasure (ECM) or self-protection (ESP), electronic support (ES), electronic attack (EA) and the like.

An ESA is generally coupled to a single control circuit to provide operations such as beamforming, modulation/demodulation, and frequency conversion. The control circuit generally includes beamforming chips receiving beamforming commands from a single controller. U.S. Pat. No. 9,478,858, incorporated herein by reference in its entirety and assigned to the assignee of the present application, discloses distributed multi-chip modules (MCMs) coupled to a controller configured for beamforming control. The controller communicates with distributed MCMs to perform functions, such as RF transmit and receive, distributed beam coefficient storage, distributed control element, and distributed computation element functions.

SUMMARY

In one aspect, embodiments of the inventive concepts disclosed herein are directed to an apparatus. The apparatus includes an electronically scanned antenna array, a beamforming circuit, a first control circuit, and a second control circuit. The beamforming circuit includes a first input, a first output, a second input, a second output and an antenna interface. The antenna interface is coupled to the electronically scanned antenna array. The first control circuit is coupled to the first input and the first output and is configured to provide first beamforming data for a first beam to the beamforming circuit via the first input and to receive first antenna signals provided by the beamforming circuit at the first output. The first control circuit includes a first modem. The second control circuit is coupled to the second input and the second output and is configured to provide second beamforming data for a second beam to the beamforming circuit via the second input and receive second antenna signals provided by the beamforming circuit at the second output. The second control circuit includes a second modem. The second modem receives the second antenna signals.

In a further aspect, embodiments of the inventive concepts disclosed herein are directed to an apparatus. The apparatus includes beam former chips, a first channel controller, and a second channel controller. Each beam former chip is associated with at least one radiating element in an electronic scanning array and includes a first control bus interface and a second control bus interface. The first channel controller is configured to provide first control signals to the first control bus interface, and the second channel controller is configured to provide second control signals to the second control bus interface. The first channel controller includes a first mode, and the second channel controller includes a second modem.

In a further aspect, embodiments of the inventive concepts disclosed herein are directed to a method of steering a plurality of beams. The method includes providing beam first steering data for a first beam to a beam former chip. The beam former chip includes a first control interface and a second control interface. The first steering data is provided to the first control interface, and the beam former chip is associated with at least one radiating element in an electronic scanning array. The method also includes providing second steering data for a second beam to the beam former chip. The second steering data is provided to the second control interface.

BRIEF DESCRIPTION OF THE FIGURES

Implementations of the inventive concepts disclosed herein may be better understood when consideration is given to the following detailed description thereof. Such description makes reference to the included drawings, which are not necessarily to scale, and in which some features may be exaggerated and some features may be omitted or maybe represented schematically in the interest of clarity. Like reference numerals in the drawings may represent and refer to the same or similar element, feature, or function. In the drawings.

DETAILED DESCRIPTION

Before describing in detail embodiments of the inventive concepts disclosed herein, it should be observed that the inventive concepts disclosed herein include, but are not limited to a novel structural combination of components and circuits disclosed herein, and not to the particular detailed configurations thereof. Accordingly, the structure, methods, functions, control and arrangement of components and circuits have, for the most part, been illustrated in the drawings by readily understandable representations and schematic diagrams, in order not to obscure the disclosure with structural details which will be readily apparent to those skilled in the art, having the benefit of the description herein. Further, the inventive concepts disclosed herein are not limited to the particular embodiments depicted in the diagrams provided in this disclosure, but should be construed in accordance with the language in the claims.

Referring to the figures generally, the various embodiments disclosed herein relate to ESA systems, apparatuses, and methods using independent control capabilities. The ESA system with independent control capabilities enhances system reliability (e.g., in airborne radar and satellite communication applications), aids interoperability with diverse equipment types reliability (e.g., in airborne satellite communication refit applications), and allows limited antenna sharing (e.g., in electronic warfare sensors applications). In some embodiments, the ESA system employs a dual output radio frequency interface beam former integrated circuit or chip. In some embodiments, the ESA system employs a dual control interface beam former integrated circuit or chip. In some embodiments, the beam former integrated circuit is coupled to common antenna elements of the ESA, the antenna elements being controlled by at least two independent control interfaces of the beam former integrated circuit and receiving or providing radio frequency signals from or to independent radio frequency output interfaces of the beam former integrated circuit.

In some embodiments, the dual control interface and the radio frequency output interface communicates with separate, dual independent masters or controllers, each having a separate modem with a unique radio frequency interface allowing multiple service operations (e.g., low earth orbiting (LEO) and geo stationary orbiting (GEO) satellites) in satellite communication applications. In some embodiments, the dual control interface and the radio frequency output interface communicates with separate, dual independent masters or controllers, each having a separate beam former controller with a unique radio frequency interface allowing redundant beam forming operations in radar applications where the beam former controller is conventionally a single point failure. In some embodiments, the dual control interface and the radio frequency output interface communicates with separate, dual independent masters or controllers, each having a separate beam former controller with a unique radio frequency interface allowing beam forming operations in electronic warfare applications and allowing directional antenna sharing.

Figure 1:
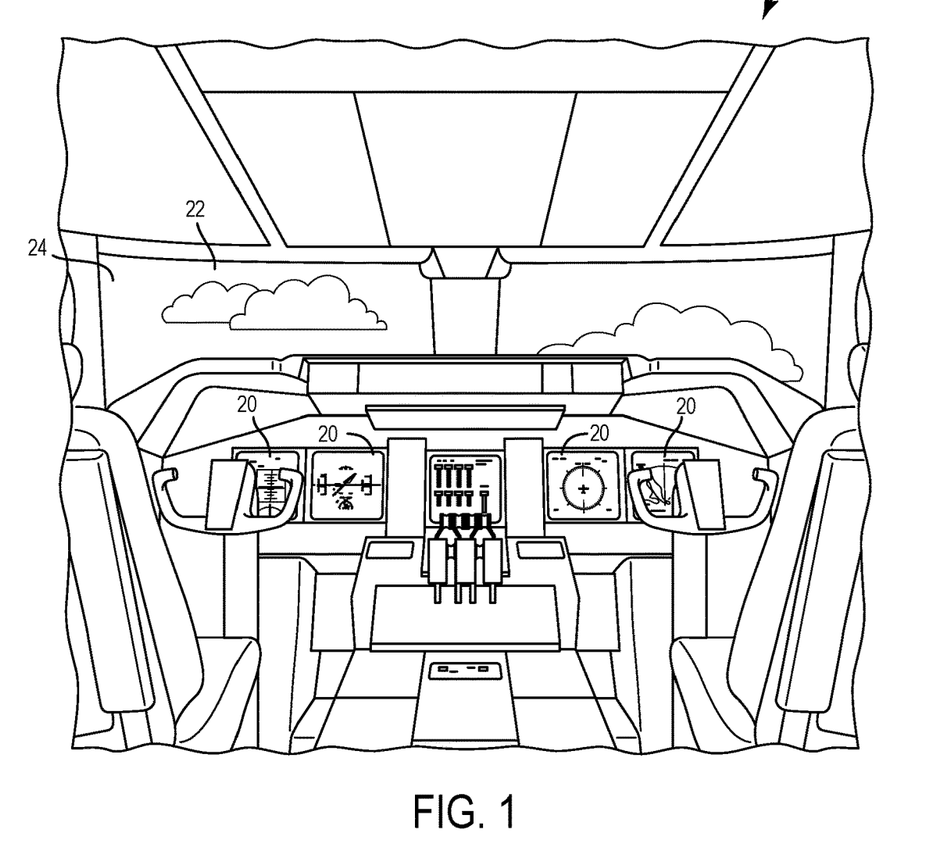
FIG. 1 is a perspective view schematic representation of an aircraft control center for an aircraft including an ESA system, according to some embodiments.

Referring to FIG. 1, an illustration of a cockpit or an aircraft control center 10 is shown, according to some embodiments. The aircraft control center 10 includes at least one flight display 20. The pilot may use flight display 20 to increase visual range and to enhance decision-making abilities. In an exemplary embodiment, flight display 20 may be configured to show weather, terrain, fixed obstacles, variable obstacles (e.g., other aircraft), flight characteristics (e.g., altitude or speed), targets, communication information, weapons and ECM information or any combination thereof. The flight display 20 can provide information from an ESA system 102 (FIG. 2).

Figure 2:
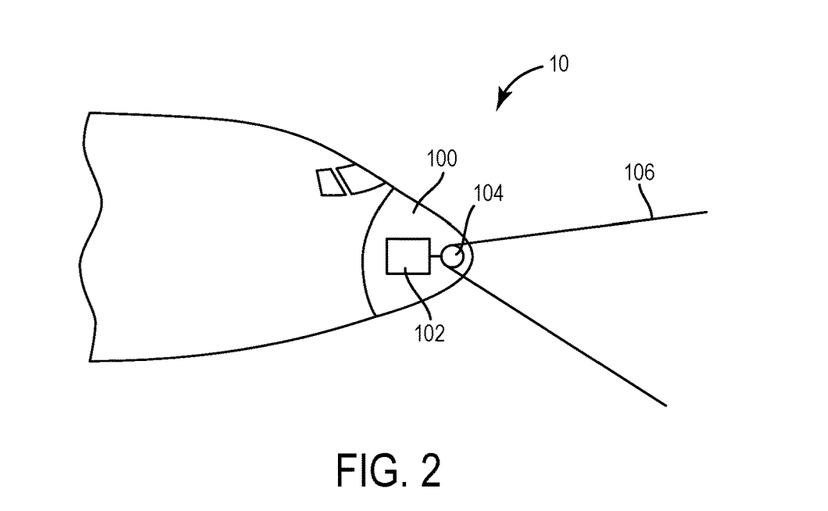
FIG. 2 is a side view schematic representation of an ESA system for the aircraft associated with the aircraft control system illustrated in FIG. 1, according to some embodiments.

In FIG. 2, the front of an aircraft is shown with the aircraft control center 10 and a nose 100, according to some embodiments. A communication system, electronic warfare system or radar system, such as the ESA system 102 is generally located inside the nose 100 of the aircraft. According to some embodiments, the ESA system 102 is located at the top of the aircraft or on the tail of the aircraft. In some embodiments, the ESA system 102 is or part of a weather radar system that is adapted to use a multiplexed beam pattern in a radar scan 106, a communication system that receives communications associated with a directional beam, or an electronic warfare system using a beam. While FIGS. 1-2 specifically discuss an aircraft employing the ESA system 102, the systems and method discussed herein can be utilized in any ESA application and can be employed on any stationary or mobile platform.

In some embodiments, the ESA system 102 includes or is coupled to an antenna 104. The antenna 104 is an array antenna including individual, electronically steerable elements in some embodiments. The antenna elements can be printed circuit board antenna elements, metallic channels or surfaces, or other conductive elements. In some embodiments, the antenna elements are balanced antipodal Vivaldi antenna (BAVA) elements. The antenna 104 can be coupled to solid state transmit/receive modules. The modules provide or receive signals at different frequencies or with different coding in some embodiments. The ESA system 102 aims beams from the antenna 104 by emitting or receiving separate radio waves from each module that interfere constructively at certain angles in front of antenna 104. The antenna 104 is steered by using phase shift units, or true time delay units in some embodiments.

Figure 3:
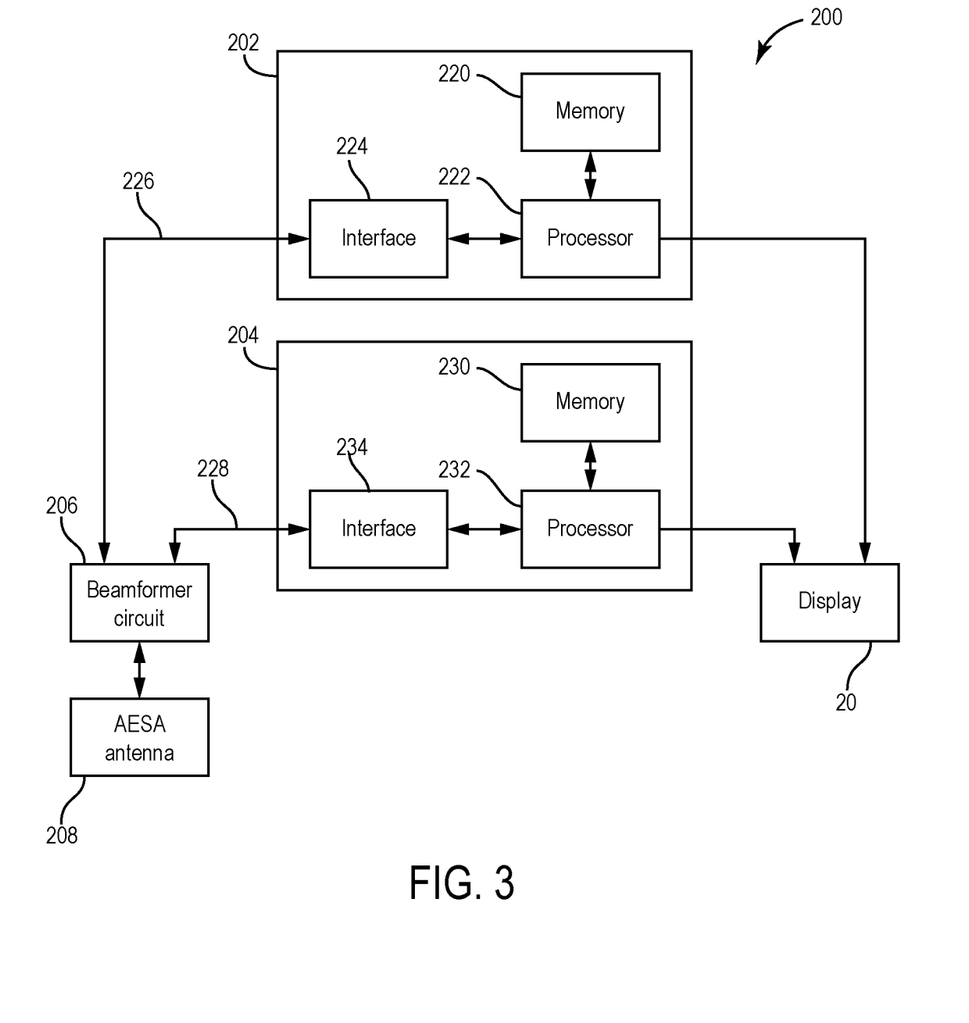
FIG. 3 is a schematic block diagram of an ESA system which can be used as the ESA system illustrated in FIG. 2, according to some embodiments.

Referring to FIG. 3, an ESA system 200 is similar to the ESA system 102 and can be used as the ESA system 102 in some embodiments. The ESA system 200 includes a controller 202, a controller 204, a beam former circuit 206, and ESA 208. The ESA system 102 is optionally coupled to the display 20 (e.g., through a display computer) in some embodiments.

The controller 202 includes a memory 220, a processor 222 and an interface circuit 224. The controller 204 is similar to the controller 202 and includes a memory 230, a processor 232 and an interface circuit 234. The controllers 202 and 204 receive signals from the beam former circuit 206 and provide signals to the beam former circuit 206 on separate busses or conductors 226 and 236 in some embodiments. The controllers 202 and 204 are configured as master controllers for controlling a uniquely steerable beam, each of the controllers 202 and 204 controlling its own beam (e.g., in azimuth, elevation, and polarity) in some embodiments.

The ESA system 200 operates as a receive only unit, a transmit only unit, or a transmit/receive unit. In some embodiments, the controllers 202 and 204 provide beam steering control commands for two beams via the conductors 226 and 228. The beam steering control commands provide time delay or phase shift data for the beam former circuit 206. In some embodiments, the controllers 202 and 204 receive radio frequency signals for two beams via the conductors 226 and 228 during receive operations. In some embodiments, the controllers 202 and 204 provide radio frequency signals for two beams via the conductors 226 and 228 during transmit operations.

The beam former circuit 206 is a dual channel circuit having independent control interfaces coupled to the interface circuits 224 and 234. The beam former circuit 206 provides time delay or phase shifting operations for beam steering operations. The beam former circuit 206 receives radio frequency signals for beam forming operations from the interface circuits 224 and 234 in some embodiments. In some embodiments, the beam former circuit 206 includes one or more silicon germanium (SiGe) chips. In some embodiments, the beam former circuit 206 is fabricated using CMOS (e.g., RF CMOS, SOI CMOS) and/or other integrated circuit processes.

The beam former circuit 206 is one or more an integrated circuits including one or more of time delay or phase shift circuits, transmit/receive circuits, receiver/exciter circuits, frequency conversion circuits, polarity selection circuits, antenna element addressing circuits, interface circuits, and filters. In some embodiments, the beam former circuit 206 includes amplifiers, low noise filters, splitters, and phase shifters or time delays designed to receive signals or data via the antenna 104 (e.g., ESA). In some embodiments, the beam former circuit 206 includes amplifiers, low noise filters, combiners, and phase shifters or time delays designed to transmit signals or data via the antenna 104. In some embodiments, the beam former circuit 206 controls the polarity of signals, a time delay, a phase shift, or other aspects required for desirable beamforming in response to signals from the controllers 202 and 204.

In some embodiments, the processors 222 and 232 are computing platforms for providing modem and baseband operations. The processors 222 and 232 communicate through the interface circuits 224 and 234 with the beam former circuit 206. In some embodiments, the processors 222 and 232 include a field programmable gate array (FPGA). On some embodiments, the processors 222 and 232 include a microprocessor, digital signal processor, an application specific integrated circuit (ASIC), or another type of control block architecture. In some embodiments, each of the conductors 226 and 236 can be configured for serial or parallel bus communications.

The memories 220 and 230 provide data storage for controllers 202 and 204. In some embodiments, the memories 220 and 230 provide a non-transitory medium for storing instructions for processors 222 and 232. The instructions provide beam forming commands in response to application requirements in some embodiments. The memories 220 and 230 can be part of processors 222 and 232 or be separate electronic storage devices.

The interface circuits 224 and 234 provide interface circuitry for providing radio frequency signals between the processors 222 and 232 and the beam former circuit 206. The interface circuits 224 and 234 can include busses, multiplexers, modems, frequency conversion circuits, transmit receive circuits, filters, and buffers in some embodiments.

Although the ESA system 200 is discussed above as an avionic radar system, the ESA system 200 can also be a ground-based, space-based, or naval-based radar system. For example, the ESA system 200 can be or include a sense and avoid (S&A) or ground moving target indicator (GMTI) radar, a search and rescue radar, a "brown out" radar, a multimode signal intelligence radar, an electronic warfare radar, a border surveillance radar, a maritime radar, a fire control radar, or a millimeter wave (MMW) imaging and landing radar used in a high data rate system (a system that may provide radar images in real-time video data format), or otherwise. As another example, the ESA system 200 as described may be used in a hybrid frequency modulated continuous wave (FMCW)/pulsed radar system.

Figure 4:
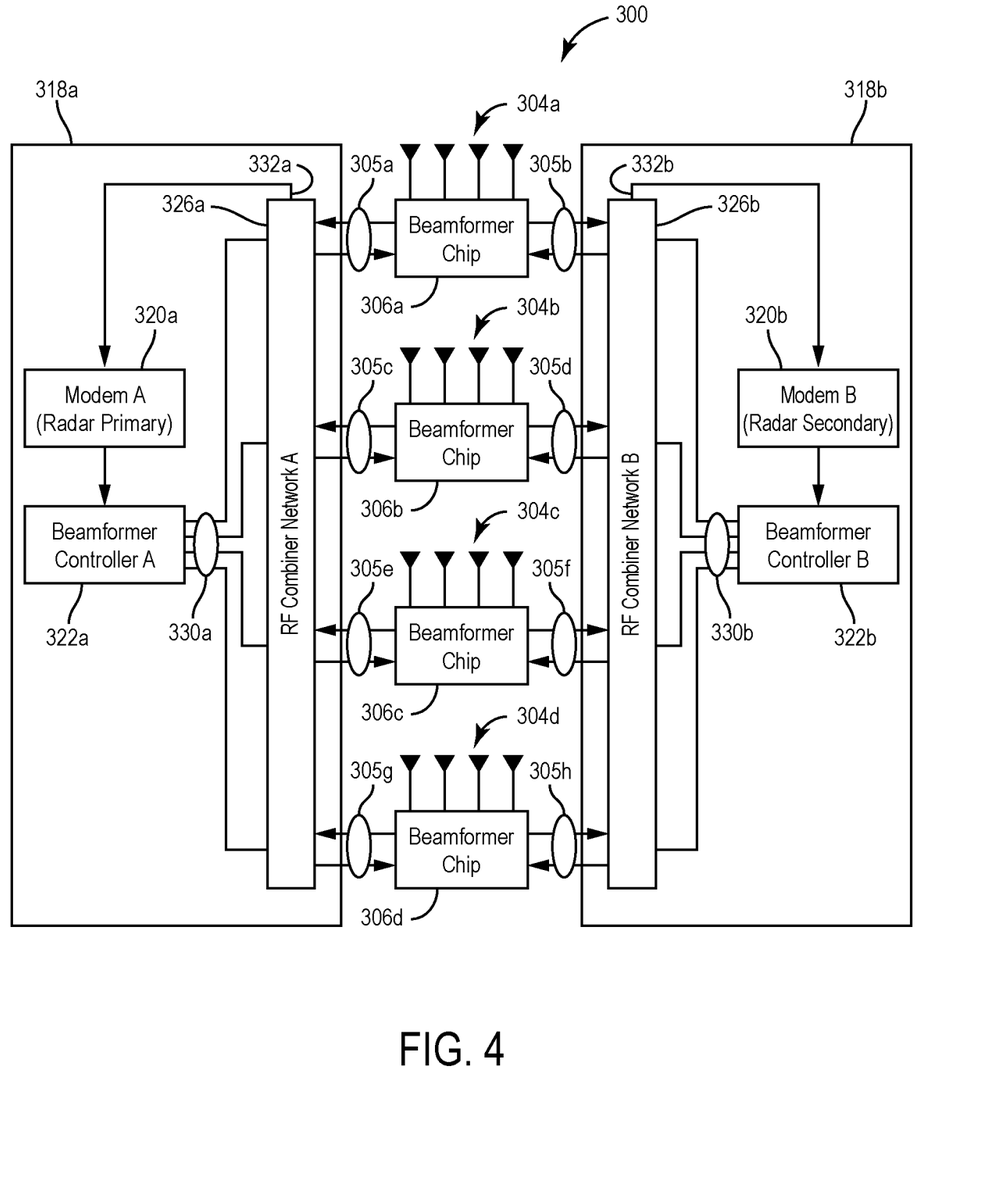
FIG. 4 is a more detailed schematic block diagram of an ESA system which can be used as the ESA system illustrated in FIG. 2, according to some embodiments according to some embodiments.

With reference to FIG. 4, an ESA system 300 is similar to the ESA system 200 and can be used as the ESA system 102 (FIG. 1) in some embodiments. The ESA system 300 includes a controller 318a for a channel A, a controller 318b for a channel B, a set of beam former chips 306a-d, and sets 304a-d of antenna elements. Each set 304a-d of antenna elements includes four antenna elements in some embodiments. The number of antenna elements in the sets 304a-d, the number of the sets 304a-d, and the number of the beam former chips 306a-d can be any number from 1 to N, where N is any integer. In some embodiments, the number of antenna elements is 192 or 256, and the number of the beam former chips 306a-d is 48 or 64. The sets 304a-d are part of an ESA and are common or shared by channels A and B in some embodiments.

The controllers 318a and 318b are coupled to the set of the beam former chips 306a-d by respective signal busses 305a-d and 307a-d. The controller 318a includes a modem 320a, a beam former computer or controller 322a, and radio frequency combiner network 326a. The controller 318b includes a modem 320b, a beam former computer or controller 322b, and radio frequency combiner network 326b. The radio frequency combiner networks 326a-b provide signals received on the sets 304a-d of antenna elements to the modems 320a-b via respective busses 332a-b.

The modems 320a-b provide demodulated data to the beam former controllers 322a-b, respectively. The beam former controllers 322a-b provide beam forming commands to the radio frequency combiner networks 326a-b, respectively. The beam former controllers 322a-b provide baseband processing and respond to received signals to provide the beam forming commands in some embodiments. In some embodiments, the beam former controllers 322a-b provide beam control commands (e.g., beam steering commands) to the radio frequency combiner networks 326a-b, respectively, via control interfaces or control busses 330a-b. In some embodiments, the beam former controllers 322a-b select the azimuth, elevation, and polarity in response to application parameters for a channel A beam and a channel B beam, respectively. The beam former controllers 322a-b are computing platforms executing software in some embodiments.

The beam former chips 306a-d communicate with the radio frequency combiner networks 326a-b via the busses 305a-d and 307 a-d, respectively. In some embodiments, the busses 305a and 307d each include a control bus for receiving the beam control commands (e.g., beam steering commands) and on output bus for providing radio frequency signals received from the sets 304a-d of antenna elements. In some embodiments, the busses 305a and 307d each include a transmit bus for provided a transmit signal for provision to the sets 304a-d of antenna elements. In some embodiments, the beam former chips 306a-d provide phase adjustments and gain control for each radio frequency channel independently. In some embodiments, the beam former chips 306a-d include registers for receiving the beam control commands. The registers store the beam former commands for channel A in a first clock cycle and for channel B in a second clock cycle in some embodiments. In some embodiments, the beam former chips 306a-d can employ an arbitration scheme to determine loading of the registers for the appropriate channel.

Figure 5:
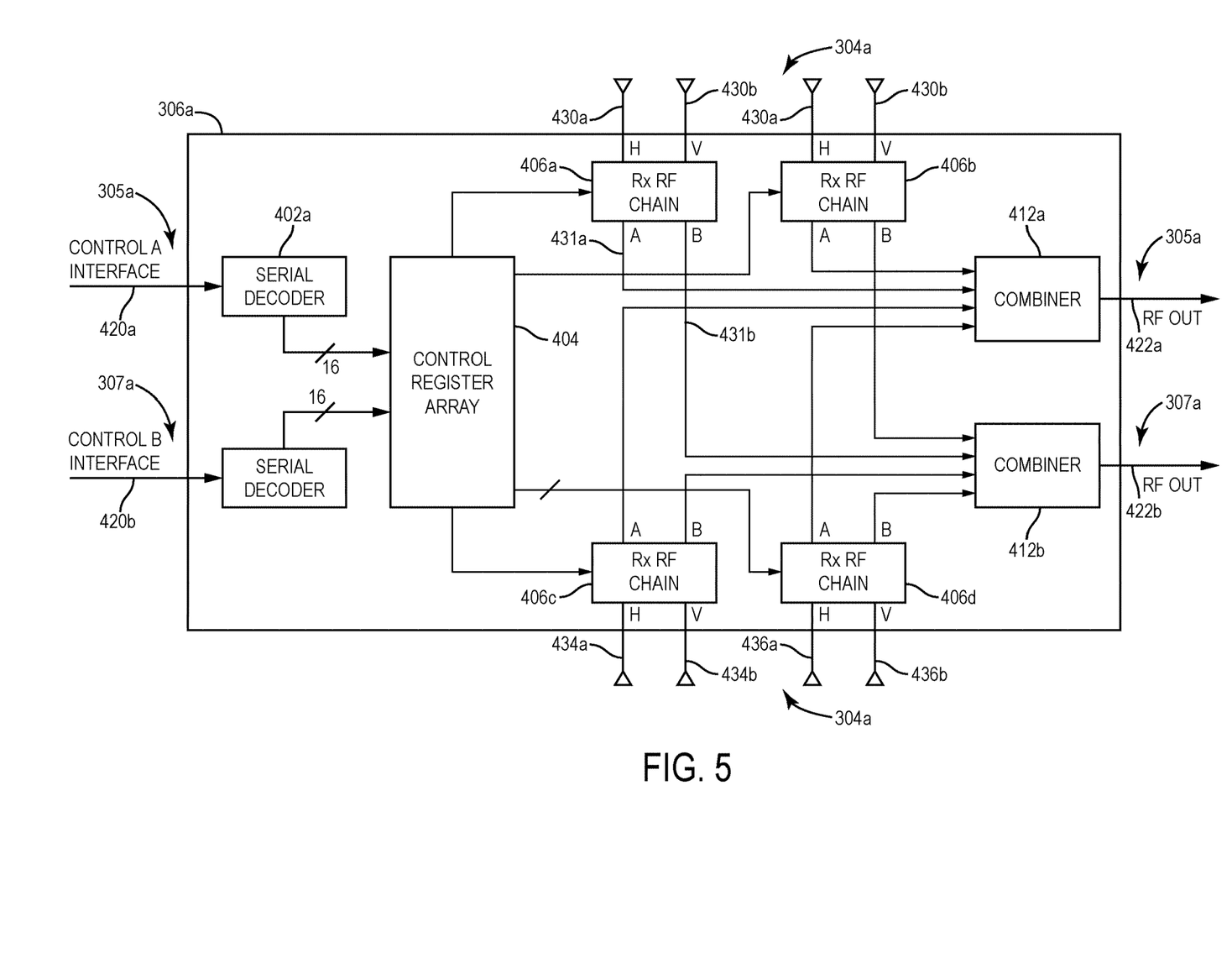
FIG. 5 is a schematic block diagram of a beam former chip which can be used in the ESA system illustrated in FIG. 4, according to some embodiments.

With reference to FIG. 5, the beam former chip 306a includes a pair of serial decoders 402a-b, a control register array 404, a set of radio frequency chain circuits 406a-d, and a pair of combiners 412a-b. The beam former chip 306a is configured as a receive chip in some embodiments. The beam former chip 306a can be configured for transmit or transmit/receive operations in some embodiments. The beam former chip 306a as shown in FIG. 5 can be identical or similar to the beam former chips 306b-d (FIG. 4).

The serial decoders 402a-b receive respective control information in serial form from control interfaces 420a-b of the busses 305a and 307a. The serial decoders 402a-b provide the control information in parallel form to the control register array 404. The control information is used to control polarity, gain, and phase for beams for channels A and B. The control information is applied to the set of radio frequency chain circuits 406a-d. The behavior of radio frequency chain circuits 406a-d are controlled by control information stored in the control register array 404.

The control register array 404 is loaded via either of the control interfaces 420a-b. In some embodiments, the control register array 404 includes registers for receiving the beam control commands. The registers store the beam former commands for channel A in a first clock cycle and for channel B in a second clock cycle in some embodiments. In some embodiments, the beam former chips 306a-d can employ an arbitration scheme to determine loading of the registers of the control register array for the appropriate channel.

The radio frequency chain circuit 406a is coupled to a horizontal polarization element 430a and a vertical polarization element 430b of the set 304a of antenna elements. The radio frequency chain circuit 406b is coupled to a horizontal polarization element 432a and a vertical polarization element 432b of the set 304a of antenna elements. The radio frequency chain circuit 406c is coupled to a horizontal polarization element 434a and a vertical polarization element 434b of the set 304a of antenna elements. The radio frequency chain circuit 406d is coupled to a horizontal polarization element 436a and a vertical polarization element 436b of the set 304a of antenna elements. The output 431a of the radio frequency chain circuit 406a is coupled to the combiner 412a, and the output 431b of the radio frequency chain circuit 406a is coupled to the combiner 412b. Similar outputs of the radio frequency chain circuits 406b-d are coupled to the combiners 412a-b in a similar fashion. The combiners 412a-b provide combined signals on radio frequency outputs 422a-b, respectively, of the buses 305a and 307a. The outputs of the radio frequency chain circuits 406b-d are combined together and presented as two separate radio frequency outputs from the beam former chip 306a in some embodiments.

Figure 6:
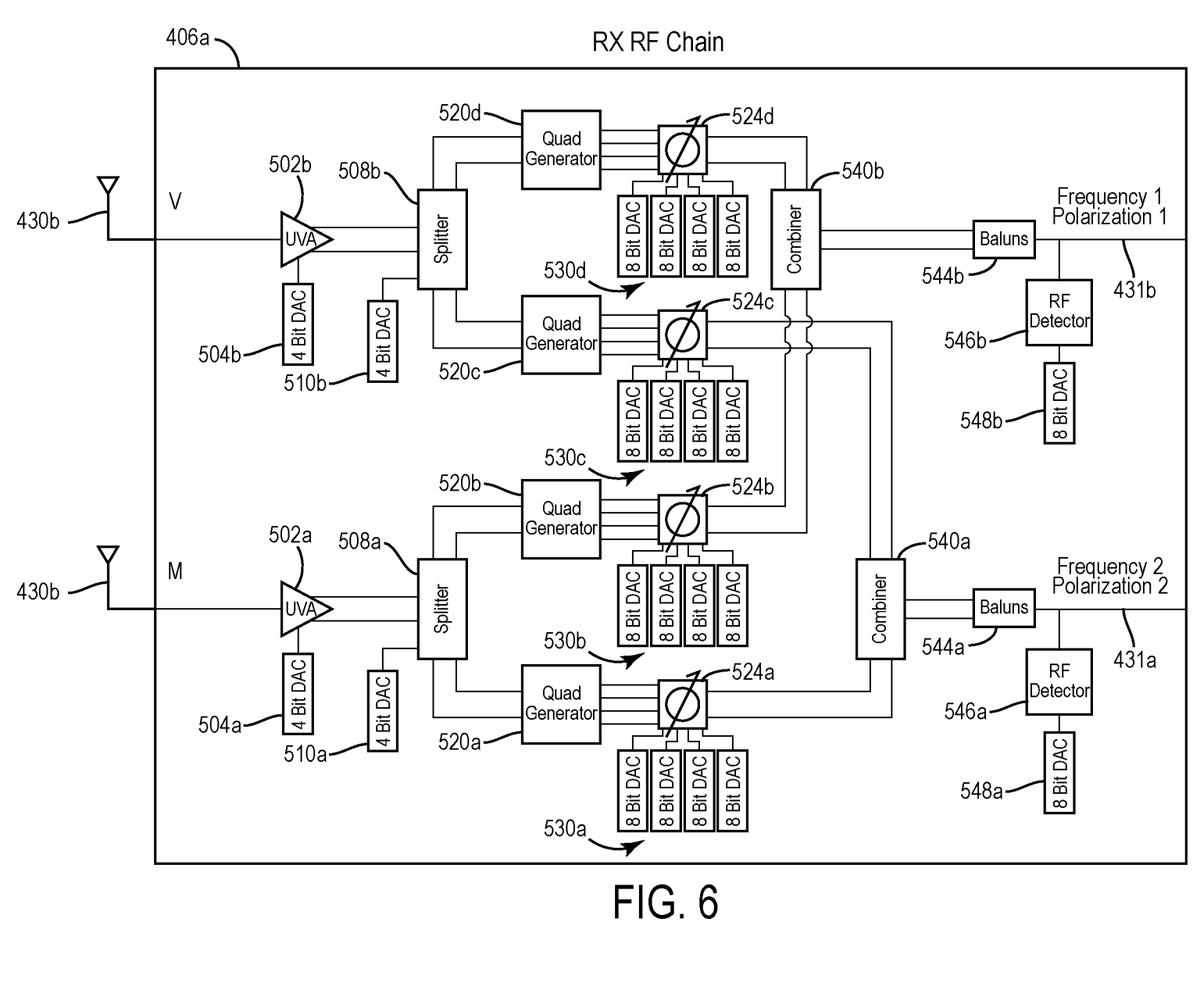
FIG. 6 is a schematic block diagram of a receive chain circuit for the beam former chip illustrated in FIG. 5, according to some embodiments.

With reference to FIG. 6, the radio frequency chain circuit 406a of the beam former chip 306a includes a pair of low noise amplifiers 502a-b, a pair of digital-to-analog converters 504a-b, a pair of splitters 508a-b, a pair of digital-to-analog converters 510a-b, a set of quadrature generators 520a-d, a set of phase shifters 524a-d, a set of digital-to-analog converters 530a-b, a pair of combiners 540a-b, a pair of baluns 544a-b, a pair of radio frequency detectors 546a-b, and a pair of digital-to-analog converters 548a-b. The radio frequency chain circuit 406a is identical or similar to the radio frequency chain circuits b-d (FIG. 5) in some embodiments.

The control information can be applied via the digital-to-analog converters 504a-b to the low noise amplifiers 502a-b, via the digital-to-analog converters 510a-b to the splitters 508a-b, via the sets of digital-to-analog converters 530a-d to the phase shifters 524a-d, and via the digital-to-analog converters 548a-b to the radio frequency detectors 546a-b. The control information provided from the control register array 404 (FIG. 4) or can be applied by discrete signals in some embodiments.

The output of the baluns 544a-b is provided to the outputs 431a-b, respectively, in some embodiments. The vertical polarization element 430b is coupled to an input of the low noise amplifier 502b, and the horizontal polarization element 430a is coupled to an input of the low noise amplifier 502a in some embodiments. The signals from the horizontal polarization element 430a and the vertical polarization element 430b are amplified and converted to a differential signaling format by the low noise amplifiers 502a-b. The differential signals are split into two paths by the splitters 508a-b and converted into quadrature signals by the quadrature generators 520a-d. The quadrature signals are supplied to the phase shifters 524a-d and recombined by the combiners 540a-b. The combined signals are reduced to a single ended signal before leaving the radio frequency chain circuit 406a by the baluns 544a-b. The radio frequency detectors 546a-b sense signals at the outputs 431a-b.

In some embodiments, the ESA system 300 is configured for communicating with a LEO satellite constellation and a GEO satellite constellation. Channel A is used for the LEO communications and Channel B is used for the GEO applications. The controller 318a manages the control interfaces, control requirements, and timing requirements for the LEO communications, and the controller 318b manages the control interfaces, control requirements, and timing requirements for the LEO communications. The separate management drastically simplifies controller operation because two different sets of requirements do not have to be managed by the same/single controller.

Parameters associated with the ESA systems 102, 200 and 300 can vary based on the operating frequencies, beam width, antenna design, and band width supported by the ESA systems 102, 200 and 300. The specific values and numbers of components of ESA systems 102, 200 and 300 described above are exemplary.

The construction and arrangement of the systems and methods as shown in the various exemplary embodiments are illustrative only. For example, although specific configurations of the ESA systems 102, 200 and 300 are discussed, other configurations can be utilized. Although only a number of embodiments have been described in detail in this disclosure, many modifications are possible (e.g., variations in sizes, dimensions, structures, s and proportions of the various elements, values of parameters, use of materials, orientations, etc.). For example, the correspondence of components to each other can be varied and the nature or number of discrete elements or positions may be altered or varied. Accordingly, all such modifications are included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the scope of the inventive concepts disclosed herein.

What is claimed is:

1. An apparatus, comprising: an electronically scanned antenna array;
   a beamforming circuit comprising a first input, a first output, a second input, a second output and an antenna interface that is coupled to the electronically scanned antenna array, the first beamforming circuit being configured to control a beam of radio waves created by the electronically scanned antenna array by providing control signals to the electronically scanned antenna array via the antenna interface:
   a first control circuit coupled to the first input and the first output of the beamforming circuit and comprising a first modem, the first control circuit being configured to provide a first beamforming command data to the beamforming circuit via the first input and to receive, via the first modem, first antenna signals associated with the beam created by the electronically scanned antenna array; and
   a second control circuit coupled to the second input and the second output of the beamforming circuit and comprising a second modem, the second control circuit being configured to provide a second beamforming command data to the beamforming circuit via the second input and to receive, via the second modem, second antenna signals associated with the beam created by the electronically scanned antenna array.

2. The apparatus of claim 1, wherein the first control circuit further comprises a first beam former controller being configured to receive the first antenna signals from the first modem and generate the first beamforming command based on the first antenna signals.

3. The apparatus of claim 2, wherein the second control circuit further comprises a second beam former controller being configured to receive the second antenna signals from the second modem and generate the second beamforming command based on the second antenna signals.

4. The apparatus of claim 1, wherein the beamforming circuit is comprised of multichip modules.

5. The apparatus of claim 1, wherein the first control circuit further comprises a radio frequency combinatorial network coupled to the first input and the first output.

6. The apparatus of claim 1, wherein the apparatus comprises a set of beamforming circuits and the beamforming circuit is part of the set of beamforming beam circuits, each beamforming circuit of the set of beamforming circuits being configured to control beams of respective antenna elements in the electronically scanned antenna array.

7. An apparatus, comprising:
a plurality of beamforming circuits, each beamforming circuit of the plurality of beamforming circuits being configured to control a beam of radio waves created by at least one radiating element in an electronic scanning array and being coupled to both a first control bus and a second control bus;
a first beamforming channel controller comprising a first modem and being configured to provide first beamforming commands to the plurality of beamforming circuits via the first control bus; and
a second beamforming channel controller comprising a second modem and being configured to provide second beamforming commands to the plurality of beamforming circuits via the second control bus.

8. The apparatus of claim 7, wherein the first beamforming channel controller comprises a first radio frequency combiner network and the second beamforming channel controller comprises a second radio frequency combiner network.

9. The apparatus of claim 8, wherein the first radio frequency combiner network provides the first commands to the plurality of beamforming circuits via the first control bus and the second radio frequency combiner network provides the second commands to the plurality of beamforming circuits via the second control bus.

10. The apparatus of claim 7, wherein the electronic scanning array comprises an array of active radiating elements.

11. The apparatus of claim 10, wherein each active radiating element of the array of active radiating element is coupled to a respective beamforming circuit of the plurality of beamforming circuits.

12. The apparatus of claim 7, wherein the first modem is coupled to a first the beam former controller being configured to receive first antenna signals from the first modem and generate the first beamforming commands based on the first antenna signals, and wherein the second modem is coupled to a second beam former controller being configured to receive second antenna signals from the second modem and generate the second beamforming commands based on the second antenna signals.

13. The apparatus of claim 7, wherein the first beamforming commands and the second beamforming commands control azimuth, elevation, and polarization of a beam.

14. The apparatus of claim 7, wherein each of the first beamforming commands and the second beamforming commands steer a beam in azimuth and elevation.

15. The apparatus of claim 7, wherein each of the first beamforming channel controller and the second beamforming channel controller are associated with a different polarization.

16. The apparatus of claim 10, wherein the electronic scanning array is configured as a receive only array.

17. An apparatus, comprising:
a plurality of beamforming circuits, each beamforming circuit of the plurality of beamforming circuits being configured to control a beam of radio waves created by at least one radiating element in an electronic scanning array and being coupled to both a first control bus and a second control bus;
a first beamforming channel controller comprising a first modem and being configured to provide first beamforming commands to the plurality of beamforming circuits via the first control bus; and
a second beamforming channel controller comprising a second modem and being configured to provide second beamforming commands to the plurality of beamforming circuits via the second control bus, wherein the electronic scanning array comprises an array of active radiating elements, wherein the electronic scanning array is configured as a transmit only array.

18. A method of steering a beam of radio waves, comprising:
providing a first beamforming command to a beamforming circuit, the beamforming circuit comprising a first control interface and a second control interface, the first beamforming command being received by the beamforming circuit via the first control interface provided to at least one radiating element in an electronic scanning array; and
providing a second beamforming command to the beamforming circuit the second beamforming command being received by the beamforming circuit via the second control interface:
providing, by the beamforming circuit a control signal generated by the beamforming circuit based on at least one of the first beamforming command or the second beamforming command to at least one radiating element in an electronic scanning array such that the at least one radiating element in the electronic scanning array steers the beam of radio waves in accordance with at least one of the first beamforming command or the second beamforming command; and wherein the first beamforming command is provided to the beamforming circuit by a first control circuit, the first control circuit comprising a first modem, a first radio frequency combiner network, and a first beam former computer, and wherein the second beamforming command is provided by a second control circuit, the second control circuit comprising a second modem, a second radio frequency combiner network, and a second beam former computer.

19. The method of claim 18, further comprising providing, by the beamforming circuit a first radio frequency signal associated with the first beam of radio waves at a first output of the beamforming circuit and providing, by the beamforming circuit, a second radio frequency signal associated with the beam of radio waves at a second output of the beamforming circuit.

* * * * *